Patented Nov. 1, 1949

2,486,807

UNITED STATES PATENT OFFICE 2,486,807

2-SULFANILAMIDO-4,5-DICARBOXYTHIAZOLE AND METHOD OF PREPARATION

James M. Sprague, Drexel Hill, Pa., assignor to Sharp & Dohme, Incorporated, Philadelphia, Pa., a corporation of Maryland No Drawing. Application March 14, 1944, Serial No. 526,487

6 Claims. (Cl. 260—239.6)

This invention relates to benzenesulfonamido-carboxy- and carboxyalkyl-thiazoles.

The products of the invention may be represented by the general formula

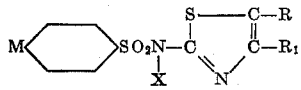

in which M is selected from hydrogen and a nitrogen-containing group as the nitro, acylamino such as acetylamino or caproylamino and the like, alkylamino as methylamino, dimethylamino and the like and the unsubstituted or free amino groups; X is hydrogen or other positive radical and R and $R_1$ are the same or different carboxyl-containing radicals selected from the carboxyl and carboxyalkyl radicals, and R and $R_1$ together with the carbons at the 4- and 5-positions of the thiazole nucleus represent a carboxybenzo radical. The carboxyalkyl radical represented by R and $R_1$ may be such as the carboxymethyl, carboxyethyl, carboxypropyl and the like and even such as carboxyoctadecyl and the like, and may be represented separately by the formula—$(CH_2)_nCOOY$, in which $n$ is a whole number and Y is a radical capable of combining with a carboxyl radical to form a carboxylate, such as the metals as the alkali metals sodium, potassium, lithium and the like, the alkaline earths as calcium, magnesium, barium and the like, antimony, copper, gold, iron, bismuth and manganese and the like, a nitrogen base as ammonium and the corresponding radicals of the alkylamines, alkanolamines, phenalkylamines and phenalkanolamines as phenethanolamine, and the like. Where the valence of the metals represented by Y is more than one, it is understood that the metal may form a carboxylate with both of the carboxyl groups in the compounds having two carboxyl groups.

The products of the invention are prepared by condensing a p-nitrobenzene-sulfonyl halide with the desired 2-aminothiazole having the desired carboxyl containing radical attached to the carbons in the 4- and 5-positions of the thiazole nucleus and with the carboxyl groups protected preferably in the form of an alkyl ester thereof, and carrying out the action preferably in an alkaline reaction medium, separating the resulting nitrobenzenesulfonamido-thiazole and de-esterifying the carboxylic acid ester radicals by heating the separated product under alkaline conditions. In this manner, there are obtained the products of the invention in which M of the general formula is the nitro group.

The products of the invention in which the element M of the general formula is the free amino group may be obtained by suitable reduction of the compounds in which M of the general formula is the nitro group. However, those having the free amino group attached to the benzene ring para to the sulfonyl radical are better obtained by condensing a para-acylaminobenzenesulfonyl halide with the desired 2-amino-thiazole having the desired carboxyl groups, preferably protected in the form of a carboxylic acid ester, attached to the 4- and 5-carbons of the thiazole nucleus, preferably in an alkaline medium, desirably pyridine, and separating the resulting 2 - (p - acylaminobenzenesulfonamido) - 4,5 - dicarbalkoxythiazole and hydrolyzing it in an alkaline medium, preferably warm, with resulting deacetylization of the p-acylamino group to the free amino group and concurrent desterification of the 4,5-carbalkoxy groupings.

The compounds in which the group represented by the element M of the general formula is an acylamino group may be prepared by condensing in alkaline medium a p-acylaminobenzenesulfonyl halide containing the desired acyl radical in the acylamino group with a 2-aminothiazole containing, preferably in the form of the carboxylic acid esters, the desired carboxy-containing groups at the 4- and 5-positions of the thiazole nucleus and separating the product resulting from such condensation and de-esterifying the carboxyl-containing radicals by carrying out the de-esterification in cold alkali.

The invention is illustrated by, but not restricted to, the following examples, in which all temperatures are centigrade and all melting points are uncorrected:

Example 1

To a solution of 12.2 grams of 2-amino-4,5-dicarbethoxythiazole dissolved in 20 cc. of dry pyridine are added slowly with stirring 13.0 grams (a 10% excess) of acetylsulfanilylchloride. The solution is allowed to stand at room temperature for 16 hours after which 10 cc. of alcohol are added to the solution which is then acidified by adding dilute (1:1) hydrochloric acid until the solution gives an acid test with "Congo-red" paper. Brown crystals form and are removed by filtration followed by washing first with 1:1 hydrochloric acid, then with water. After drying, the product 2-$N^4$-acetylsulfanilamido-4,5-dicarbethoxythiazole melts at 181–184°, and after recrystallization from dilute alcohol at 187–189°.

Example 2

10 grams of 2-N⁴-acetylsulfanilamido-4,5-dicarbethoxythiazole are dissolved in 50 cc. of 10% sodium hydroxide solution and heated for 1 hour on a steambath. 50 cc. of water are added and the solution neutralized with concentrated hydrochloric acid. The hot solution is decolorized by treatment with "Norite" and after removing the "Norite" by filtration, the solution is then acidified with an excess of hydrochloric acid. The precipitated 2-sulfanilamido-4,5-dicarboxythiazole is filtered from the hot mixture and washed well, first with water then with alcohol. After drying it melts at 239° with effervescence. On dissolving the compound in sodium bicarbonate solution, decolorizing with "Darco" and reprecipitating the product by adding an excess of hydrochloric acid to the hot solution, the thus further purified compound melts at 251° with effervescence.

Example 3

Preparation of 2-amino-4-carbethoxymethyl-5-carbethoxythiazole: 1 mol of sulfuryl chloride is added dropwise to a mol of ethyl acetonedicarboxylate,

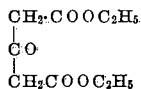

with stirring and external cooling. The mixture is then heated on a steambath until evolution of gas ceases and then slowly added to a mol of thiocarbamide suspended in anhydrous alcohol and refluxed for 15 minutes, cooled, poured into 4 volumes of water, neutralized with sodium bicarbonate and thoroughly chilled. The white crystals of 2-amino-4-carbethoxymethyl-5-carbethoxythiazole melt at 112°, resolidifying to melt at 128–129°.

To a solution of 17.2 grams of 2-amino-4-carbethoxymethyl-5-carbethoxythiazole in 30 cc. of warm, dry pyridine, 17.2 grams of p-acetylaminobenzenesulfonyl chloride are added slowly with vigorous agitation of the pyridine solution. After standing for 16–24 hours at room temperature, the reaction mixture is diluted with 60 cc. of alcohol and made strongly acid with concentrated aqueous hydrochloric acid. A light-yellow granular solid separates, melting point 238–240°. After decolorizing with carbon and crystallization from alcohol, the 2-(N⁴-acetylsulfanilamido) - 4 - carbethoxymethyl - 5 - carbethoxythiazole melts at 245–246° after sintering at 240°.

Example 4

The 2-(N⁴-acetylsulfanilamido)-4-carbethoxymethyl-5-carbethoxythiazole is dissolved in 10% sodium hydroxide, using approximately 10 cc. per gram. After heating on a steambath for thirty minutes, the solution is neutralized with hydrochloric acid and decolorized with carbon. The decolorized solution is made strongly acidic with concentrated hydrochloric acid. The hydrochloride of 2-sulfanilamido-4-carboxymethyl-5-carboxythiazole crystallizes from the solution. This was recrystallized by dissolving in a small amount of water and, after decolorizing, adding an equal volume of concentrated hydrochloric acid. The hydrochloride melted with effervescence around 185°. The exact temperature depends upon the rate of heating and the starting temperature of the melting point bath.

To a solution of the hydrochloride in a small amount of water, a saturated solution of sodium bicarbonate was added cautiously until the solution reacted weakly acidic to "Congo-red." The crystalline 2-sulfanilamido-4-carboxymethyl - 5 - carboxythiazole which separated from the solution was recrystallized from a small volume of water. It melts with effervescence in the range 175–185° depending upon the condition of the determination and then resolidified and remelted at 236–237°.

Example 5

To 1.2 grams of 2-amino-4,5-dicarbethoxythiazole dissolved in 10 cc. of pyridine, is added slowly 1.1 grams p-nitrobenzenesulfonyl chloride. The solution is allowed to stand at room temperature for 16 hours and is then triturated with 20 cc. of hot alcohol. On chilling, tan crystals separate from solution. On drying the 2-(p-nitrobenzenesulfonamido) - 4,5 - dicarbethoxythiazole melts at 139–143° after sintering at 120°. The compound, on recrystallization from alcohol, melts at 138–143° after sintering at 110°.

Example 6

60 grams of 2-amino-6-carbethoxybenzthiazole are condensed with 70 grams of acetylsulfanilyl chloride in 40 cc. of pyridine as a solvent in manner similar to the corresponding condensations in the other examples. After letting the reaction mixture stand at room temperature for several days the solution is diluted with an equal volume of alcohol and then acidified with dilute hydrochloric acid, with cooling. Upon addition of cold water to this acid solution, the 2-N⁴-acetylsulfanilamido - 6 - carbethoxybenzthiazole is precipitated. After two crystallizations from 70% alcohol following treatment of the alcohol solution with "Darco" and subsequent filtration, the compound when dry, melts at 260–261°. After several additional recrystallizations from 70% alcohol, the compound melts at 262–263°.

Example 7

13 grams of 2-acetylsulfanilamido-6-carbethoxybenzthiazole are dissolved in 130 cc. of 10% sodium hydroxide solution and heated with stirring for three hours on the steambath. The solution is then acidified and the precipitated 2-sulfanilamido-6-carboxybenzthiazole is separated by filtration. It is then dissolved in a dilute solution of sodium bicarbonate and the solution heated and acidified by the addition of dilute hydrochloric acid. The separated product is washed with alcohol and dried. It melts at 302.5°.

The expression "carboxylate" employed in this specification and the claims includes the common carboxylate forms such as the carboxylate salt as well as the carboxylate ester.

The invention of these products comprises the usefulness of this type of product as intestinal antiseptics for combatting and reducing the concentration of organisms causing intestinal infection.

While the invention has been illustrated by certain specific embodiments thereof, it is understood that various changes, substitutions and additions may be made in the various specific compounds disclosed and in the particular formulae thereof to have the additional other compounds not specifically, individually mentioned herein but embraced within the scope of the invention as generically disclosed herein.

What is claimed is:

1. A benzenesulfonamido - 4,5 - dicarboxy thiazole having the general formula

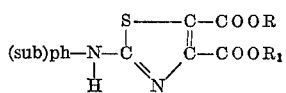

in which "(sub)ph" is a benzenesulfonyl group linked to the nitrogen in the general formula through the sulphur atom and having linked to its benzene radical and in para-position to the sulphur atom a group which is a member of the class consisting of the free amino group, and the acylamino and nitro groups; and R and $R_1$ are individually a cation selected from the class consisting of hydrogen, alkali metals, and alkaline earth metals with one valence of the alkaline earth metal taking the place of each of R and $R_1$ when R and $R_1$ are selected from the alkaline earth metals.

2. A 2-(p-acylaminobenzenesulfonamido)-4,5-dicarboxy-thiazole.

3. 2-(p-nitrobenzenesulfonamido) - 4,5 - dicarboxy-thiazole.

4. 2-sulfanilamido-4,5-dicarboxy thiazole.

5. The process for producing 2-sulfanilamido-4,5-dicarboxythiazole which comprises reacting a dialkyl 2-aminothiazole-4,5-dicarboxylate with acetylsulfanilylchloride to give a dialkyl 2-acetylsulfanilamidothiazole-4,5-dicarboxylate and hydrolyzing to give 2-sulfanilamido-4,5-dicarboxythiazole.

6. The process for producing 2-sulfanilamido-4,5-dicarboxythiazole which comprises reacting diethyl 2-aminothiazole-4,5-dicarboxylate with acetylsulfanilylchloride to give diethyl 2-acetylsulfanilamidothiazole-4,5-dicarboxylate and hydrolyzing to give 2-sulfanilamido-4,5-dicarboxythiazole.

JAMES M. SPRAGUE.

REFERENCES CITED

The following references are of record in the file of this patent:

UNITED STATES PATENTS

| Number | Name | Date |
| --- | --- | --- |
| 2,324,013 | Moore | June 13, 1943 |
| 2,332,906 | Foldi | Oct. 26, 1943 |
| 2,362,087 | Newberry | Nov. 7, 1944 |

FOREIGN PATENTS

| Number | Country | Date |
| --- | --- | --- |
| 517,272 | Great Britain | Jan. 25, 1940 |
| 210,425 | Switzerland | Oct. 1, 1940 |
| 113,723 | Australia | Aug. 20, 1941 |

OTHER REFERENCES

Beilstein, Vierte Auflage, vol. 27, page 352.

Chem. Abstracts, March 1943, pp. 1403–1404, citing Proceedings Indian Acad. Sci., vol. 16A, pages 115–125 (1942).